(12) United States Patent
Mihály et al.

(10) Patent No.: US 9,843,901 B2
(45) Date of Patent: Dec. 12, 2017

(54) TECHNIQUE FOR IDENTIFYING AT LEAST ONE MOBILE TERMINAL USER TRAVELLING IN A VEHICLE COMPRISING A CONNECTED DEVICE

(71) Applicant: Telefonaktiebolaget LM Ericsson (publ), Stockholm (SE)

(72) Inventors: Attila Mihály, Dunakeszi (HU); Norbert Purger, Budapest (HU); Mate Szalay-Beko, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/512,589

(22) PCT Filed: Sep. 30, 2014

(86) PCT No.: PCT/EP2014/070921
§ 371 (c)(1),
(2) Date: Mar. 20, 2017

(87) PCT Pub. No.: WO2016/050280
PCT Pub. Date: Apr. 7, 2016

(65) Prior Publication Data
US 2017/0257742 A1 Sep. 7, 2017

(51) Int. Cl.
*H04W 24/00* (2009.01)
*H04W 4/02* (2009.01)
*H04W 4/04* (2009.01)
*H04W 8/24* (2009.01)

(52) U.S. Cl.
CPC ........... *H04W 4/023* (2013.01); *H04W 4/046* (2013.01); *H04W 8/24* (2013.01)

(58) Field of Classification Search
CPC ........ H04W 4/023; H04W 4/046; H04W 8/24
USPC ...................... 455/456.1, 456.3, 456.5, 456.6
See application file for complete search history.

(56) References Cited

U.S. PATENT DOCUMENTS

| | | | |
|---|---|---|---|
| 6,707,374 B1 * | 3/2004 | Zaharia ................... | B66B 1/468 187/392 |
| 2008/0248801 A1 * | 10/2008 | Fletcher .................. | H04W 4/02 455/435.2 |
| 2008/0270204 A1 * | 10/2008 | Poykko ................... | G06Q 10/04 705/7.29 |
| 2013/0344856 A1 * | 12/2013 | Silver ............... | H04M 1/72577 455/418 |

(Continued)

FOREIGN PATENT DOCUMENTS

WO    2013147903 A1    10/2013

*Primary Examiner* — Khai M Nguyen
(74) *Attorney, Agent, or Firm* — Coats & Bennett, PLLC

(57) ABSTRACT

A technique for identifying at least one mobile terminal travelling in a vehicle is disclosed, wherein the vehicle comprises a connected device. In a method aspect, the method comprises initializing a list of identifiers, IDs, of at least one candidate mobile terminal currently travelling in the vehicle, obtaining a current first position of the connected device and a current second position of the at least one candidate mobile terminal, comparing the current first position and the current second position so as to determine whether the current first and second positions match, and iteratively refining the list of IDs depending on the match of the current first and second positions by repeating the steps of obtaining and comparing until a predetermined condition is met.

21 Claims, 4 Drawing Sheets

(56) References Cited

U.S. PATENT DOCUMENTS

| | | | | |
|---|---|---|---|---|
| 2014/0143839 A1* | 5/2014 | Ricci | ............. | H04W 12/06 |
| | | | | 726/4 |
| 2016/0021595 A1* | 1/2016 | Czaja | ............. | H04W 36/32 |
| | | | | 455/440 |
| 2016/0309440 A1* | 10/2016 | Fuchiwaki | ............. | H04W 4/046 |
| 2017/0099601 A1* | 4/2017 | Prabdial | ............. | H04W 8/04 |

\* cited by examiner

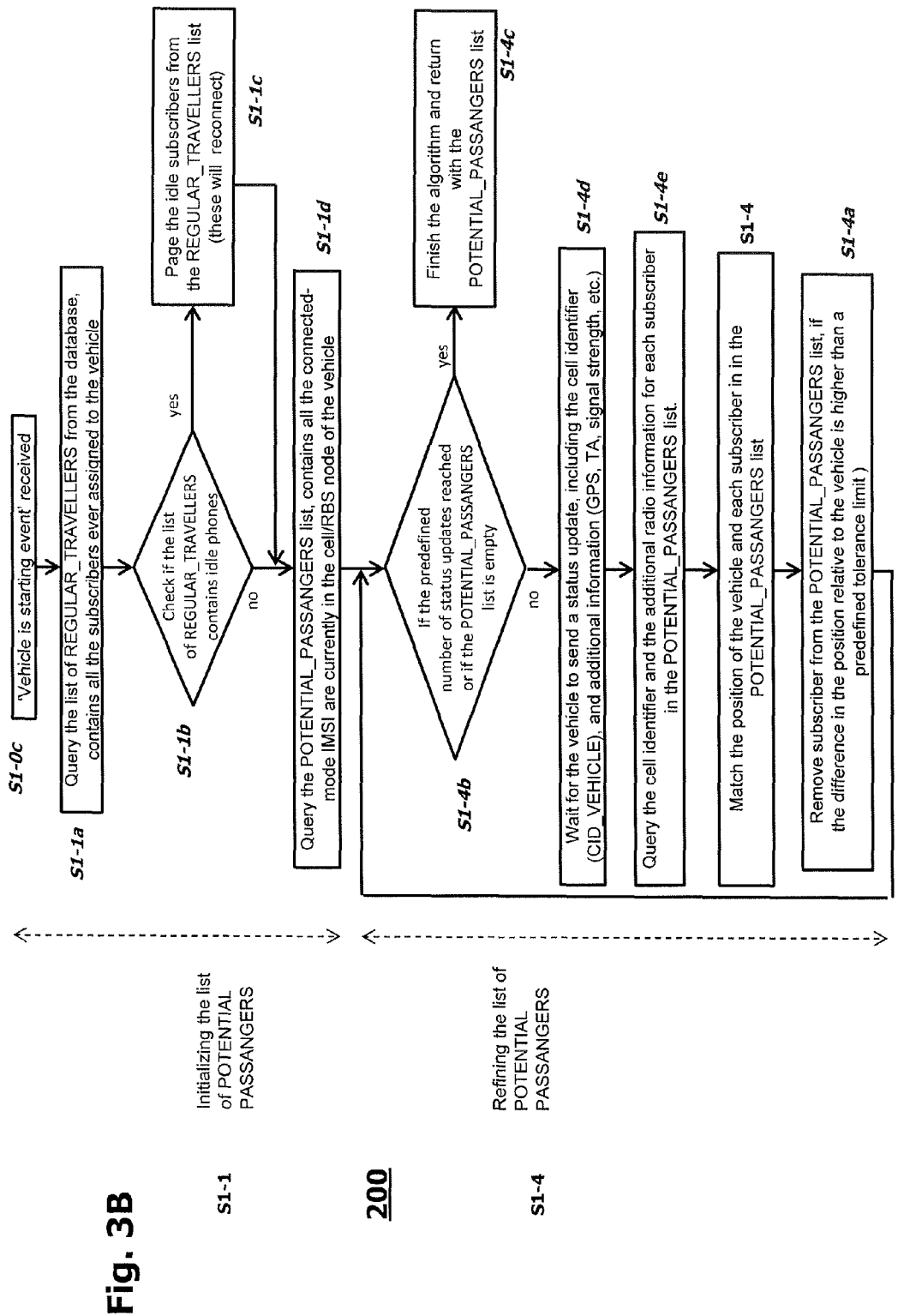

TECHNIQUE FOR IDENTIFYING AT LEAST ONE MOBILE TERMINAL USER TRAVELLING IN A VEHICLE COMPRISING A CONNECTED DEVICE

TECHNICAL FIELD

The present disclosure generally relates to the field of vehicle telematics. In particular, the disclosure relates to a technique for identifying at least one mobile terminal user travelling in a vehicle comprising a connected device. The technique of the present disclosure may be embodied in one or more of a method, an apparatus, and a computer program.

BACKGROUND

Telematics applications provide a variety of services via telecommunication devices with the purpose of controlling, providing information to or receiving information from remote objects. The field of vehicle telematics relates to the special scenario in which the remote objects are vehicles.

It is well known that many telecommunication services are based on context information indicative of the current environment in which a particular telecommunication device, such as a mobile terminal, is used. From a passenger's perspective, traveling in vehicle is a very definite context, and passengers could thus benefit from ubiquitous services, including telecommunication services, that are aware of this context.

There has been an approach to correlate passengers' mobile terminals and vehicles by installing a dedicated device into a vehicle, which device would connect (e.g., using short distance radio communication) to any mobile terminal in the vehicle, and broadcast an identifier to these "on-board" mobile terminals. Later on, both the vehicle device and the mobile terminals would communicate the same identifier to the network, so the network can make a correlation using this identifier. Communicating these 'vehicle' identifiers to the network by the terminals would require significant software (and possibly hardware) impact on the terminals, and also might impact 2-4G ($2^{nd}$ to $4^{th}$ generation) signaling protocol standards.

Moreover, other existing correlation solutions rely on either manual interaction, ad ministration from the passenger's side (e.g., installing applications on mobile terminals, or pairing their terminals with in-vehicle Bluetooth™ devices) or some sort of other special devices used or carried by the passengers or installed in the vehicles, which devices need to communicate with the passengers' mobile terminals.

However, these special requirements, especially manual interactions and the impact on the mobile terminals, limit the spread and applicability of any service that would benefit from or rely on context information indicative of a traveling vehicle.

SUMMARY

Accordingly, there is a need for an implementation of a technique that avoids one or more of the problems discussed above, or other, related problems.

In a first aspect, there is provided a method for identifying at least one mobile terminal travelling in a vehicle comprising a connected device. The method comprises initializing a list of identifiers, IDs, of at least one candidate mobile terminal currently travelling in the vehicle, obtaining a current first position of the connected device and a current second position of the at least one candidate mobile terminal, comparing the current first position and the current second position so as to determine whether the current first and second positions match, and iteratively refining the list of IDs depending on the match of the current first and second positions by repeating the steps of obtaining and comparing until a predetermined condition is met.

In one variant, a customized grouping of mobile terminals can thus be attained. The resulting group of one or more mobile terminals can be associated with specific context information (e.g., travelling in a vehicle in general, travelling in the vehicle comprising a particular connected device, and so on). That context information, in turn, may be exploited for providing dedicated services or other purposes.

The connected device may be constituted or comprised by a device enabling a vehicle to communicate wirelessly via mobile connectivity (e.g., to transmit or receive telematics information). The connected device may in particular provide built-in mobile connectivity to the vehicle, the driver or its passengers. In one variant, the connected device is on on-board part of a vehicle telematics system.

The connected device may be or comprise a Subscriber Identity Module, SIM, card (e.g., detachably) installed in the vehicle. In that case, the SIM card may be an embedded SIM card. Alternatively, the SIM card may be associated with (e.g., installed in) one of the following items installed in the vehicle: an emergency call device, a diagnostics device, a vehicle theft protection device, a Wi-Fi™ hotspot, a navigation device, an entertainment system, a mobile telephone, and a mobile terminal connected to the central computer of the vehicle. Accordingly, the connected device has no need for an implementation as a separate entity. It may in certain variants reuse pre-installed items in modern vehicles.

The IDs may be constituted by or derived from International Mobile Subscriber Identities, IMSIs; one such derived ID may be a Mobile Station Integrated Services Digital Network Number (MSISDN). Of course, also other IDs could be used, in particular pre-assigned IDs that need not particularly assigned for the purpose of the technique presented herein.

The method may also comprise, prior to the initializing step, a pre-populating step. The pre-population step may be based on information that permits to "populate" a list with mobile terminal IDs. The pre-populating step may thus in one variant comprise a pre-selection of IDs of one or more candidate mobile terminals in list form. By this measure, the initial list of IDs can be kept short, so that a comparatively small number of iterations may yield the IDs of one or more mobile terminals actually travelling in the vehicle.

The pre-populating step may be performed on the side of a telecommunication network. As an example, the pre-populating step may comprise a communication between one or more access network nodes (e.g., base stations) and one or more core network nodes (e.g., a dedicated or non-dedicated core network node for passenger identification).

In a first option the pre-populating step may comprise pre-populating the list of IDs with IDs of regular travellers related to the connected device. In that case, the pre-populating step may be performed by registering subscribers at a (e.g., dedicated) core network node for passenger identification.

As a further pre-populating option, that may be combined with the first option, the pre-populating step may be performed by obtaining IDs of all mobile terminals in a cell on which the connected device currently camps on. In the latter case, the IDs of the mobile terminals may be obtained from one or more of a Mobility Management Entity, MME, providing a list of mobile terminals in the Connected state for a given base station, the mobile terminals or the MME configured to perform cell reporting during handover, the mobile terminals in the Connected state providing at least one of signal strength information and their respective distance from a base station, an Internet Protocol Multimedia Subsytem, IMS, providing network-provided location information, and another core network node.

As a still further pre-population option, that may be combined with any of the above options, the pre-populating step may be performed based on at least one of information from previously created lists of IDs of the at least one candidate mobile terminal, previous call logs from a charging system, information on family and friends from a Customer Relationship Management, CRM, system, and historical information based on one of terminal location and movement statistics.

The method may further comprise triggering, prior to the initializing step, commencement of the initializing step by a start event of the vehicle. In that case, the triggering step may be performed by one of the connected device, a core network node and a user. In the latter case, if the triggering is performed by the connected device, the connected device may perform the triggering based on at least one of an event signalling the start of the vehicle, a movement of the vehicle, and an event signalling a special condition detected by the connected device. The event signalling the start of the vehicle may be one of start and ignition of the vehicle. The special condition may be one of a crash, a motor problem and a flat tire, or a similar safety-critical event.

As a further option, if the triggering is performed by a core network node, the core network node may perform the triggering based on booting or activating the connected device upon receipt of an event signalling the start or movement of the vehicle. As another option, if the triggering is performed by the user or a core network node, the core network node may perform based on the triggering one of booting and activating the connected device upon receipt of an event signalling the start or movement of the vehicle. As a still further option, if the triggering is performed by the user, the user may perform the triggering based on informing the network concerning an imminent intention to travel with or drive the vehicle. The foregoing triggering options may also be combined.

With these triggering options, it can be ascertained that the proposed technique is in one variant started upon occurrence of a significant event. For instance, upon start or ignition, it is reasonable to assume that possibly new users have entered the vehicle; likewise, when conducting the proposed technique upon a vehicle crash, a grouping of the possibly injured persons can be performed to allow for a more efficient emergency aid.

In one variant, the step of iteratively refining may further comprise removing an ID from the list of candidate mobile terminals if the current first position of the connected device and the second position of the at least one candidate mobile terminal do not match. In that case, the steps of comparing and iteratively refining may be further based on at least one of a cell ID of the connected device, a signal strength indicator of the associated base station related to the cell ID of the connected device, a timing advance parameter of the associated base station related to the cell ID of the connected device, Global Positioning System, GPS, coordinates of the base station and the connected device, and Media Access Control, MAC, addresses visible to a local Wi-Fi™ hotspot.

As an option, the removing step may be further based on at least one of the following: the cell ID of the connected device matches with the cell ID of the at least one candidate mobile terminal, the distance from the connected device to the associated base station matches, within a tolerance, the distance from the at least one candidate mobile terminal to the associated base station, the signal strength variations of the connected device and the at least one candidate mobile terminal i) exhibit a similar pattern and ii) match with an expected pattern on the site of the vehicle, the MAC address of the candidate mobile terminal having a Wi-Fi™ status ON is visible in an access point of the connected device.

By the above measures, the list can iteratively be further refined and augmented, taking into account additional information pertaining to the nature or site of the connected device and/or the mobile terminals.

The predetermined condition to be met by the step of iteratively refining the list of IDs may be at least one of a predetermined number of iterations, a predetermined period of time, and a predetermined number of iterations during which the list remains unchanged. In this way, it is ascertained that the list is sufficiently "stable" prior to coming to a conclusive list of IDs.

In a second aspect, there is provided a computer program product comprising program code portions for performing the method of the first aspect when the computer program product is executed on one or more computing devices. The computer program product may be stored on a computer readable recording medium, such as a semiconductor memory or an optical disk. The computer program product may also be provided for download via a wired or wireless network connection.

In a third aspect, there is provided an apparatus for identifying at least one mobile terminal travelling in a vehicle comprising a connected device. The apparatus comprises a component configured to initialize a list of identifiers, IDs, of at least one candidate mobile terminal currently travelling in the vehicle, a component configured to obtain a current first position of the connected device and a current second position of the at least one candidate mobile terminal, a component configured to compare the current first position and the current second position so as to determine whether the current first and second positions match, and a component configured to iteratively refine the list of IDs depending on the match of the current first and second positions by repeating the steps of obtaining and comparing until a predetermined condition is met.

The apparatus may be realized or comprised by a network node, such as a core network node of a telecommunication network. The apparatus may be realized in the form of a dedicated core network node for passenger identification (also called Passenger Identification Service, PIS, node herein) or a PIS service resident on an existing core network node.

Still further, it is to be noted that the method aspects may also be embodied on the apparatus of the third aspect. In such a case the apparatus components recited herein may comprise at least one processor and memory with processor-readable instructions for carrying out any one of the method steps.

BRIEF DESCRIPTION OF THE DRAWINGS

Embodiments of the technique presented herein are described herein below with reference to the accompanying drawings, in which:

FIG. 3B shows a second method embodiment which also reflects the interaction between the components of the apparatus embodiment of FIG. 2.

DETAILED DESCRIPTION

In the following description, for purposes of explanation and not limitation, specific details are set forth (such as particular signalling steps) in order to provide a thorough understanding of the technique presented herein. It will be apparent to one skilled in the art that the present technique may be practiced in other embodiments that depart from these specific details. For example, the embodiments will primarily be described in the context of $3^{rd}$ generation (3G) or $4^{th}$ generation/Long Term Evolution (4G/LTE) telecommunication networks; however, this does not rule out the use of the present technique in connection with other (future) telecommunication technologies.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

An increasing number of vehicles provides built-in mobile connectivity via so-called connected devices; actually it is expected for all vehicles to be connected to a mobile network soon. In aspects of the following embodiments, a solution is provided to identify groups of people ("passengers") traveling together in a wirelessly connected vehicle. Passengers are identified through their mobile terminals, and also the vehicle is identified by its connectivity (e.g., by the SIM card embedded or installed in the vehicle as part of a wireless service such as emergency call service, diagnostics service, vehicle theft protection service, Wi-Fi™ hotspot, navigation service, etc.).

In certain realizations described in more detail herein below, and without loss of generality, "follower" mobile equipments (MEs, such as mobile terminals) are identified from an initial list of potential mobile equipment moving together with a given "followed" ME (such as a connected device) installed in a vehicle. One possible general implementation starts with (1) obtaining an identifier (e.g., a cell identifier of a servicing cell) associated with the "followed" ME, then (2) creating an initial list of "follower" MEs, and (3) iteratively refining the list of the "follower" MEs. The refining may be performed by comparing positions of "follower" MEs derived from information available in the mobile network with that of the "followed" ME.

Figure 1:
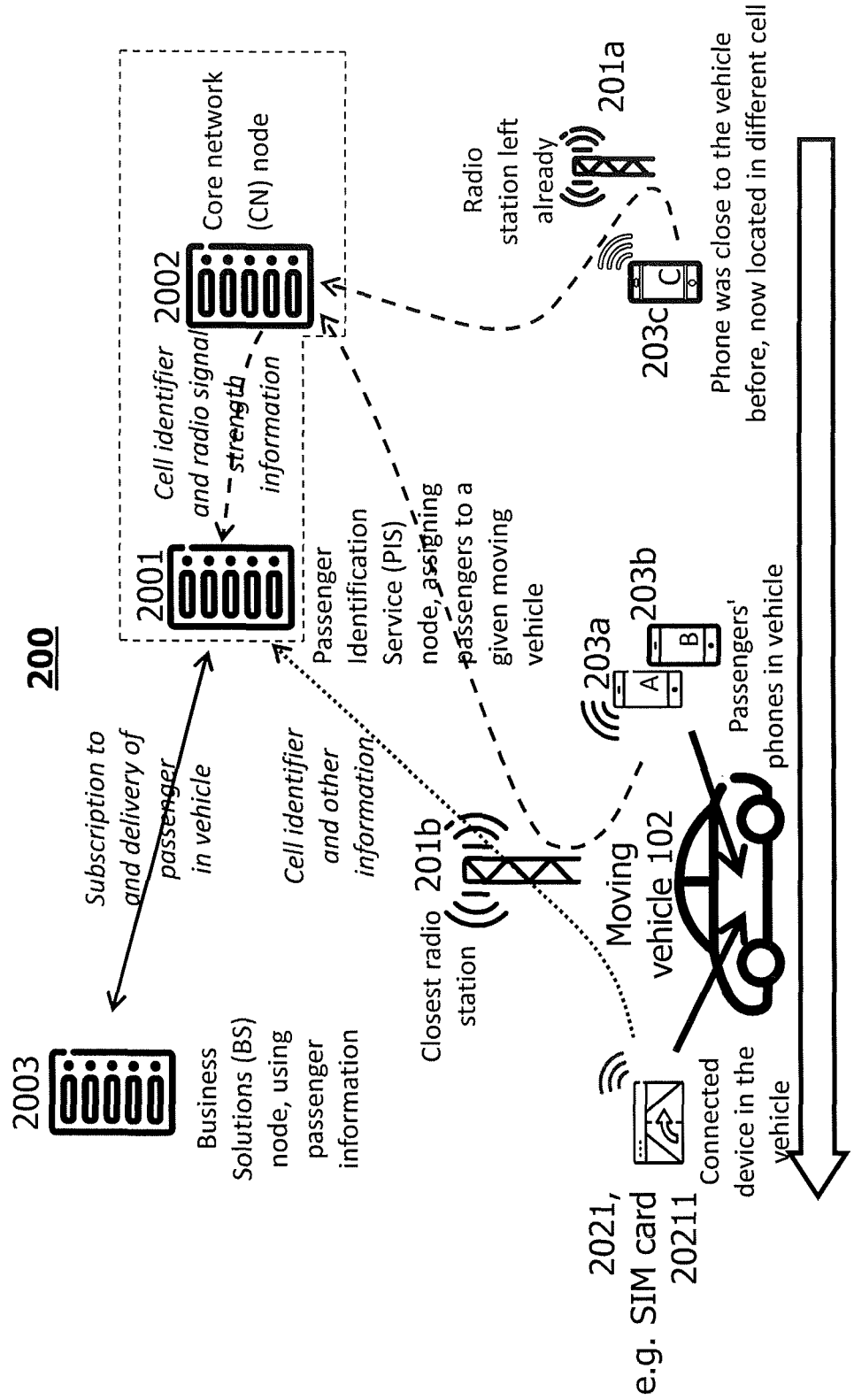
FIG. 1 shows a system embodiment of a telecommunication network (and components involved) in which the present disclosure can be performed.

FIG. 1 shows an embodiment of a telecommunication network system 200 in which aspects of the present disclosure can be performed. The telecommunication network system 200 comprises, in a core network portion, a Passenger Identification Service (PIS) node 2001, a further core network (CN) node 2002 and a Business Solutions (BS) node 2003. One or more of the nodes 2001, 2002, 2003 may have access to access networks, for example to Radio Base Stations (RBSs), or cells, 201a, 201b.

A moving vehicle 102 within the system 200 comprises a connected device 2021 (e.g., in the form of a SIM card 20211 installed in a telematics component of the vehicle 102). Further, in the example illustrated in FIG. 1, two mobile terminals 203a, 203b (of passengers "A" and "B") may be travelling inside (i.e., together with) the vehicle 102, whereas another mobile terminal 203c (of another person "C") is located outside the vehicle 201.

The telecommunication network system 200 is configured to provide a service (PIS) that permits to assign mobile terminals 203a, 203b of passengers A and B to the moving vehicle 102, while also identifying mobile terminal 203c as belonging to person C who is not a passenger. The service can be implemented as a new node 2001 in the core network or as a new service running on an existing core network node 2002. The service is in one variant capable of determining the list of IMSIs or other identifiers associated with the passengers A, B of a given vehicle 102 for each trip, using information from the access network as will be detailed hereinbelow.

Figure 2:
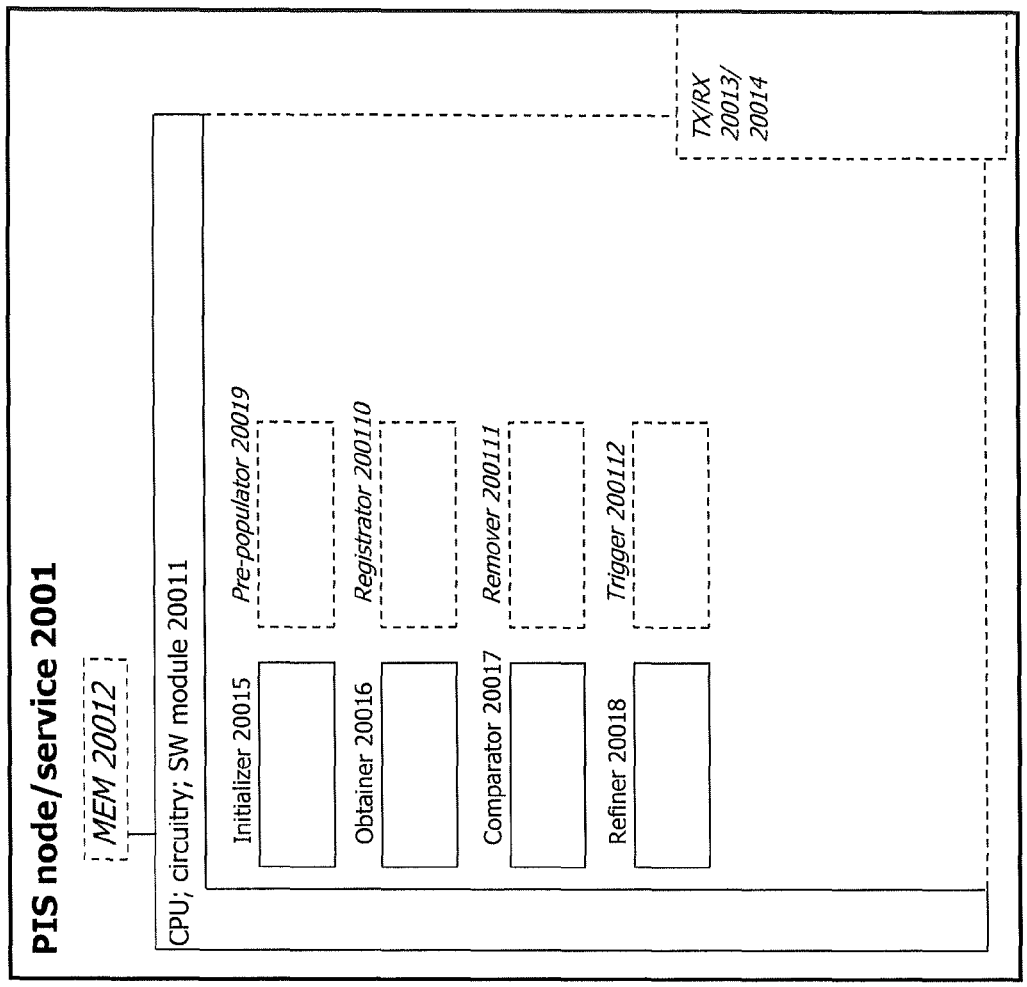
FIG. 2 shows components comprised in an exemplary device embodiment realized in the form of an apparatus (which may reside, e.g., on/in a PIS node/service)

FIG. 2 shows components comprised in an exemplary device embodiment realized in the form of the PIS node (or service) 2001. As shown in FIG. 2, the PIS node 2001 comprises a core functionality (e.g., one or more of a Central Processing Unit (CPU), dedicated circuitry and/or a software module) 20011, an optional memory (and/or database) 20012, an optional transmitter 20013 and an optional receiver 20014. Moreover, the PIS node 2001 comprises an initializer 20015, an obtainer 20016, a comparator 20017, a refiner 20018, an optional pre-populator 20019, an optional registrator 200110, an optional remover 200111 and an optional trigger 200112.

As partly indicated by the dashed extensions of the functional block of the CPU 20011, the initializer 20015, the obtainer 20016, the comparator 20017, the refiner 20018, the pre-populator 20019, the registrator 200110, the remover 200111 and the trigger 200112 (of the PIS node 2001) as well as the memory 20011, the transmitter 20013 and the receiver 20014 may at least partially be functionalities running on the CPU 20012, or may alternatively be separate functional entities or means controlled by the CPU 20011 and supplying the same with information. The transmitter and receiver components 20013, 20014 may be realized to comprise suitable interfaces and/or suitable signal generation and evaluation functions.

The CPU 20011 may be configured, for example, using software residing in the memory 20012, to process various data inputs and to control the functions of the memory 20012, the transmitter 20013 and the receiver 20014 (as well as of the initializer 20015, the obtainer 20016, the comparator 20017, the refiner 20018, the pre-populator 20019, the registrator 200110, the remover 200111 and the trigger 200112 (of the PIS node 2001)). The memory 20012 may serve for storing program code (e.g., executable instructions) for carrying out method aspects of the present disclosure, when executed by the CPU 20011.

It is to be noted that the transmitter 20013 and the receiver 20014 may be provided as an integral transceiver, as is indicated in FIG. 2. It is further to be noted that the transmitters/receivers 20013, 20014 may be implemented as physical transmitters/receivers for transceiving via an air interface or a wired connection, as routing/forwarding entities/interfaces between network elements, as functionalities for writing/reading information into/from a given memory area or as any suitable combination of the above. At least one of the initializer 20015, the obtainer 20016, the comparator 20017, the refiner 20018, the pre-populator 20019, the registrator 200110, the remover 200111 and the trigger 200112 (of the PIS node 2001), or the respective functionalities, may also be implemented as a chipset, module or subassembly.

In one embodiment, the connected device 2021 is or comprises a Subscriber Identity Module, SIM, card 20211 installed in the vehicle 102 (see FIG. 1). Such SIM card 20211 may be one of an embedded SIM card and a detachably attached SIM card in the vehicle 102. As an example, the SIM card 20211 may be associated with (e.g., usable for mobile communication by) at least one of the following items installed in the vehicle 102: an emergency call device, a diagnostics device, a car theft protection device, a Wi-Fi™ hotspot, a navigation device, an entertainment system, a mobile telephone, and a mobile terminal connected to the central computer of the vehicle.

Figure 3A:
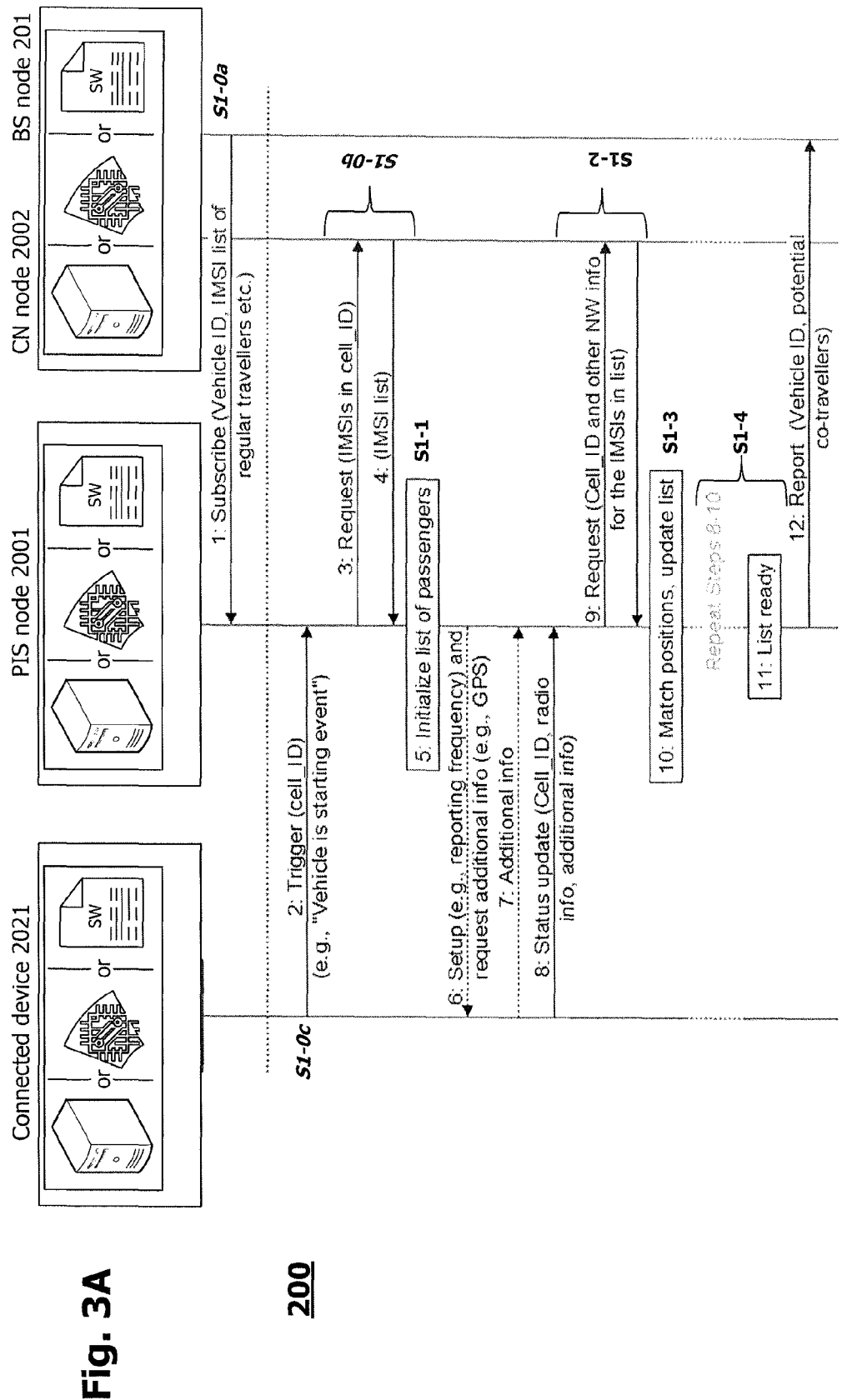
FIG. 3A shows a first method embodiment which also reflects the interaction between the components of the apparatus embodiment of FIG. 2.

FIG. 3A shows a first method embodiment which reflects the interaction between the components of the device embodiments illustrated in FIGS. 1 and 2, while FIG. 3B shows a second method embodiment which also reflects the interaction between the components of these device embodiments. FIGS. 3A and 3B can be read together as a single embodiment, or can be read individually as different embodiments.

In the signalling diagram of FIG. 3A, time aspects between signalling are reflected in the vertical arrangement of the signalling sequence as well as in the sequence numbers. It is to be noted that the time aspects indicated in FIG. 3A do not necessarily restrict any one of the method steps shown to the step sequence outlined in FIG. 3A. This applies in particular to method steps that are functionally disjunctive with each other.

In an optional initial step S1-0a, the pre-populator 20019 of the PIS node 2001 pre-populates a list with IDs of one or more candidate mobile terminals (e.g., IMSIs or IDs derived therefrom, such as MSISDNs) associated with regular travellers (i.e., potential passengers) related to the vehicle 102 with the connected device 2021. For instance, the regular travellers may to this end be subscribed to a particular service. As an example, the pre-populating step may involve registering the subscribers at the PIS node 2001.

In this context, as part of the service configuration, a list of regular travelers (REGULAR_TRAVELERS) per "followed" ME (i.e., connected device 2021) can be created in a database (such as by/in one or more of the BS nodes 201a) and provided to the PIS node 2001. This task can for example be done by manually "registering" subscribers to a connected device ID, such as a connected device IMSI (e.g., based on a service contract), or starting with all the devices in a given cell (see FIG. 36, steps S1-1a to 1-1d).

In a further (or alternative), optional step S1-0b, the obtainer 20016 of the PIS node 2001 may obtain IDs of all mobile terminals 203 in a cell on which the connected device currently camps on. That is, the IMSIs of the mobile terminals 203 located to the same mobile cell than the connected device 2021 may be inquired, for example from the core network.

In this context, the IDs of the mobile terminals 203 may be obtained from one or more of the following information sources:

A core network node 2002 in the form of a Mobility Management Entity, MME, providing a list of mobile terminals 203 in the Connected state for a given base station 201. Accordingly, if the whereabouts of a certain mobile terminal 203 in Idle state is to be known, then a terminal 203 in question may be paged by the MME, and based on this paging process, the terminal turns to Connected state and performs a Service Request, specifying its current cell location (see FIG. 3B, steps S1-1c and 1-1d).

The mobile terminals 203 or the MME are/is configured to perform cell reporting during handover. Without loss of generality, such cell reporting may be performed on the basis of $3^{rd}$ Generation Partnership Project (3GPP) Technical Specification (TS) 23.401.

The mobile terminals 203 in the Connected state provide at least one of signal strength information and their respective distance from a base station 201. That is, and again without loss of generality, information for the mobile terminals 203 in Connected state, like signal strength (e.g., CQI) or distance from the base stations 201 (the latter needed for keeping the mobile terminals 203 in synchronization with the base stations 201 by compensating for propagation delays, e.g., as described in 3GPP TS 36.213), may be made available. The information may be obtained from a core network node in charge of Operation and Maintenance (O&M) (optionally with configurable update frequency).

An Internet Protocol Multimedia Subsystem, IMS, in the core network provides network-provided location information. Without loss of generality, such IMS usage may be performed on the basis of 3GPP TS 23.842.

Another core network node.

Other alternatives for gathering the required information may be possible in current and future networks. For example, the current User Plane Congestion management (UPCON) work item in 3GPP proposes various alternatives of obtaining information about the mobile terminals in a (congested) cell to the core network. The alternatives being discussed include scenarios where the mobile terminal IMSI—Cell ID mappings are available in a single core network node.

Still further, the pre-populating step S1-0a may be performed additionally or alternatively based on at least one of information from previously created lists of IDs of the at least one candidate mobile terminal 203, previous call logs from a charging system in the core network, information on family and friends from a Customer Relationship Management, CRM, system, and historical information based on one of terminal location and movement statistics.

Still further, in an optional step S1-0c, the trigger 200112 of the PIS node 2001 triggers, prior to the initializing step, commencement of the initializing step by a start event of the vehicle 102. That is, when the PIS node 2001 is informed about the start event of a vehicle 102 (e.g. is notified by the connected device 2021, by the access or core network, or otherwise), then an initial list of IDs associated with potential passengers is created.

The triggering step S1-0c may be performed by one of the connected device 2021, a core network node 2002 and a user (e.g., the driver or a passenger of the vehicle 102). In this regard, certain steps the proposed method embodiments may start with an event of the starting of a vehicle 102. This event can come from multiple sources, so that there are at least three cases of events:

If the triggering is performed by the connected device 2021, the connected device 2021 may perform the triggering based on at least one of an event signalling the start of the vehicle 102, a detected movement of the vehicle 102, and an event signalling a special condition detected by the connected device 2021. The event signalling the start of the vehicle 102 may be one of start and ignition of the vehicle 102, and/or the special condition is one of a crash detection and a flat tire.

In other words, the connected device 2021 in the vehicle 102 can notify one or both of the access or core network about the start of the engine (e.g., using the On-Board Diagnostics (OBD) interface and monitoring the ignition events) or about the movement of the vehicle 102 (e.g., using built-in accelerometer or GPS).

If the triggering is performed by the core network node 2002, the core network node 2002 may perform the triggering based on booting or activating the connected device 2021 when an event signalling the start or movement of the vehicle 102 is received. Alternatively, or in addition, if the triggering is performed by the user or core network node 2002, the PIS node 2001 may perform, based on the triggering, one of booting and activating the connected device 2021 when an event signalling the start or movement of the vehicle 102 is received.

Also, the core network can monitor the connected device 2021 (e.g., when the connected device 2021 is configured to be booted/activated only when the ignition is turned on, the core network can notice when the connected device 2021 is registering in the network).

If the triggering is performed by the user (e.g., the driver or a passenger), the user may perform the triggering based on informing the network concerning an imminent intention to travel with or drive the vehicle 102.

As an example, the user may inform the network about the new trip (e.g., using a smart phone application).

Then, in step S1-1, the initializer 20015 of the PIS node 2001 performs initializing (optionally based on the above-described pre-populated information) a list of IDs (such as IMSIs or IDs derived therefrom) of one or more candidate mobile terminals 203 currently travelling in the (same) vehicle 102. The initializing step S1-1 may comprise receiving the list from a network side (optionally upon a dedicated request). Alternatively, or in addition, the initializing step S1-1 may comprise configuring the list for processing the information included therein.

For processing the list, an iterative refinement of the list is performed by removing more and more IDs from the list (as will be described in more detail below). To this end, the connected device 2021 may be instructed to report the cell ID of the cell it is residing in and, optionally, additional radio information (e.g., the signal strength and the timing advance parameter received from the eNodeB) regularly (see steps 6 and 8 in FIG. 3A) or upon request.

Additionally, other information may be requested to ease the identification process, such as GPS coordinates or MAC addresses visible to a local Wireless access point (Wi-Fi™ AP) (see steps 7 and 8 in FIG. 3A).

Then, in step S1-2, the obtainer 20016 of the PIS node 2001 performs obtaining a current first position of the connected device 2021 and a current second position(s) of the one or more candidate mobile terminals 203.

Further, in step 1-3, the comparator 20017 of the PIS node 2001 performs comparing the current first position and the current second position(s) so as to determine whether the current first and second positions match. A match may, for example, be determined based on identical cell IDs or based on GPS coordinates.

Finally, in step S1-4, the refiner 20018 of the PSI node 2001 performs iteratively refining the list of IDs depending on the match of the current first and second positions by repeating the steps of obtaining and comparing until a predetermined condition is met.

In this context, in an optional step S1-4a, the remover 200111 of the PIS node 2001 performs removing an ID from the list of candidate mobile terminals if the current first position of the connected device 2021 and the second position of at least one candidate mobile terminal 203c do not match. In other words, the final list of passengers for vehicle 102 is attained by gradually removing IDs (e.g., IMSIs) from the initial list, when according to the received information for a given mobile terminal 203 (as requested from the core network node 2002), the positions of the given mobile terminal 203 and of the connected device 2021 installed to the vehicle 102 do not match.

In the latter case, the steps of comparing and iteratively refining can be (further) based on at least one of the following parameters:

A cell ID of the connected device 2021.
A signal strength indicator of the associated base station 201b related to the cell ID of the connected device 2021.
A timing advance parameter of the associated base station 201b related to the cell ID of the connected device 2021.
Global Positioning System, GPS, coordinates of the base station 201b and the connected device 2021.
Media Access Control, MAC, addresses visible to a local Wi-Fi™ hotspot.

As an option, the removing step may be (e.g., further) based on at least one of the following:

The cell ID of the connected device 2021 matches with the cell ID of the at least one candidate mobile terminal 203.
The distance from the connected device 2021 to the associated base station 201b matches, within a tolerance, the distance from the at least one candidate mobile terminal 203a, 203b to the associated base station 201b. In this context, the distance may be determined or augmented via GPS coordinates.
The signal strength variations of the connected device 2021 and the at least one candidate mobile terminal 203a, 203b fulfil the following conditions: i) exhibit a similar pattern and ii) match with an expected pattern on the site of the vehicle 102. In other words, the signal strength variations should be similar (within an acceptable limit) and also match with the expectations derived from the whereabouts of the vehicle 102 (e.g., available through the GPS position).
The MAC address of the candidate mobile terminal 203 having a Wi-Fi™ status ON is visible in an access point of the connected device 2021.

The predetermined condition to be met by the step of iteratively refining is, in the present embodiment, at least one of a predetermined number of iterations, lapse of predetermined period of time since start of the iterations, and a predetermined number of iterations during which the list remains unchanged (see FIG. 3B, steps S1-4b and S1-4c). In this context, it is to be noted that the above-described refinement may be continued until a predefined time or until the list is 'stable' enough to yield, with a certain degree of conclusiveness, that the remaining IDs in the list pertain to "real" passengers of the vehicle 102. It can be expected that the list converges fast. The mobile terminal distance information is available with low granularity and the likelihood that the "follower" mobile the terminals 203a, 203b and the vehicle 102 (i.e., the "followed" connected device 2021) are changing positions relative the base stations 201 in a similar way while not being in the same place is low and may be further reduced by additional signal strength and Wi-Fi™ information, as described above.

Still further, it may be envisaged to optionally employ data from the vehicle 102 to enhance the proposed solution.

It is noted that the proposed embodiments do not rely on any capability of the vehicle 102 or its connected device(s) 2021. However, additional optimization can be attained if the vehicle 102 (or the connected device(s) 2021 in the vehicle 102) can report different events to the network (e.g., related to the starting, stopping of the vehicle 102, or its GPS position). For instance, the start/stop events can be acquired either from GPS or from a standard On Board Diagnostics, OBD, interface of the vehicle 102. There are several OBD compatible devices in the market (that can be deployed to the majority of current vehicles), and many machine-to-machine services are based on the OBD devices. The start/stop events can trigger PIS to start or finish the passenger identification.

Many vehicles 201 and connected devices 2021 have built-in GPS (which is powered by the vehicle battery, so it can be used easier than a built-in smart phone GPS). The GPS information can be combined with the location of the base stations 201 and can be used, for example, to determine the time when the PIS should recheck the correlation of access network information of the connected device 2021 and the mobile terminals 203 (see FIG. 3B, steps S1-4d and S1-4e).

connected devices 2021 usually have capability to send regular data (e.g., over the Internet Protocol, IP) about the status of their radio connection (e.g., the identifier of the active mobile cell, the list of nearby cells, the strength of the radio connection). If regular or requested notifications concerning those data items can be obtained, the access network needs not to be used in order to obtain the same data.

If the connected device 2021 is also capable of obtaining information about a local network provided for the vehicle 102 (e.g., Wi-Fi™ AP provided in the vehicle 102), that information could be used to enhance the association by monitoring the MAC addresses of nearby mobile terminals 203 trying to connect—or already associated with—the local network. For example, if the vehicle 102 is in a moving state and the related MAC addresses still appear for the access point, the probability that a mobile terminal 203 is moving together with the connected device 2021 (in the vehicle 102) is very high.

The proposed embodiments primarily aim to provide a precise association based on information available from a single mobile operator's access and core network and subscribers. Of course, it may also be envisaged to implement a working solution across multiple operators. In case one would like to include in the proposed technique a potential passenger mobile terminal 203 for which specific information from the operator's network are not available, other methods relying on additional components (e.g., the Wi-Fi™ AP monitoring the local MAC addresses) are still possible.

As has become apparent from the above embodiments, the present disclosure may provide one or more of the following advantages.

The proposed solution does in certain implementations not require any modification in the vehicle 102 or in the connected device(s) 2021 installed in the vehicle 102. Rather, only standardized (e.g., GSM, UMTS, or LTE) signalling protocols may be used to identify the passengers of the vehicle 102 via their mobile terminals 203. As such, the proposed solution makes the natural context information of passengers travelling together in a vehicle 102 easily available for services that are offered as part of the telematics solution or directly towards the passengers. Such services can be:

Emergency services: In case of a car crash, information of passengers can be forwarded to the authorities; the information also could be attached to the emergency calls. For instance, ECall1 is an initiative of the European Council, to put a connected device 2021 in the future in each vehicle 102 sold in the EU, which device 2021 would automatically call 112 in case of a detected collision. The proposed solution could also extend the ECall initiative, which would give the opportunity to standardize the same.

Subscriber profiles can be extended with information like 'frequent travelers' and 'occasional drivers'. Subscriber groups can be identified who are traveling together, and that information can be used, e.g., for content item delivery, including delivery of ads.

Adding for example velocity, signal strength information, that may be very valuable for special services, e.g., background traffic scheduling or video Quality of Experience, QoE, optimization.

Building co-operations with vehicle manufacturers (getting more anonymized feedback about the vehicle usage), and other parties in the automotive industry (fuel companies, repair stations, authorities, etc.).

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for identifying at least one mobile terminal travelling in a vehicle comprising a connected device, the method comprising:
   initializing a list of identifiers (IDs) of at least one candidate mobile terminal currently travelling in the vehicle;
   obtaining a current first position of the connected device and a current second position of the at least one candidate mobile terminal;
   comparing the current first position and the current second position so as to determine whether the current first and second positions match; and
   iteratively refining the list of IDs depending on the match of the current first and second positions by repeating the obtaining and comparing until a predetermined condition is met, wherein:
      the predetermined condition to be met is a predetermined number of iterations during which the list remains unchanged; and
      the iteratively refining the list of IDs comprises removing an ID from the list of candidate mobile terminals responsive to the current first position of the connected device not matching the second position of the at least one candidate mobile terminal.

2. The method of claim 1, wherein the connected device is or comprises a Subscriber Identity Module (SIM) card installed in the vehicle.

3. The method of claim 2, wherein the SIM card is attached to at least one of the following items installed in the vehicle:
- an emergency call device;
- a diagnostics device;
- a car theft protection device;
- a Wi-Fi hotspot;
- a navigation device;
- an entertainment system;
- a mobile telephone; and/or
- a mobile terminal connected to the central computer of the vehicle.

4. The method of claim 1, wherein the IDs are constituted by or derived from International Mobile Subscriber Identities.

5. The method of claim 1, further comprising, prior to the initializing, pre-populating the list of IDs with IDs of regular travelers related to the connected device.

6. The method of claim 5, wherein the pre-populating is performed by registering subscribers at a core network node.

7. The method of claim 5, wherein the pre-populating is performed by obtaining IDs of all mobile terminals in a cell on which the connected device currently camps on.

8. The method of claim 7, wherein the IDs of the mobile terminals are obtained from one or more of:
- a Mobility Management Entity (MME) providing a list of mobile terminals in a connected state for a given base station;
- the mobile terminals or the MME configured to perform cell reporting during handover;
- the mobile terminals in the connected state providing at least one of signal strength information and their respective distance from a base station;
- an Internet Protocol Multimedia Subsystem providing network-provided location information; and
- another core network node.

9. The method of claim 5, wherein the pre-populating is performed based on at least one of:
- information from previously created lists of IDs of the at least one candidate mobile terminal;
- previous call logs from a charging system;
- information on family and friends from a Customer Relationship Management system; and
- historical information based on one of terminal location and movement statistics.

10. The method of claim 1, further comprising, prior to the initializing, triggering commencement of the initializing by a start event of the vehicle.

11. The method of claim 10, wherein the triggering is performed by at least one of:
- the connected device;
- a core network node; and
- a user.

12. The method of claim 11, wherein the triggering is performed by the connected device based on at least one of:
- an event signaling the start of the vehicle;
- a movement of the vehicle; and
- an event signaling a special condition detected by the connected device.

13. The method of claim 12, wherein:
the event signaling the start of the vehicle is one of start and ignition of the vehicle; and/or
the special condition is a safety-critical condition of the vehicle.

14. The method of claim 11, wherein the triggering is performed by the core network node based on booting or activating the connected device while an event signaling the start or movement of the vehicle is received.

15. The method of claim 11, wherein the triggering is performed by the user or a core network node, and wherein a Passenger Identification Service (PIS) node performs, based on the triggering, one of booting and activating the connected device while an event signaling the start or movement of the vehicle is received.

16. The method of claim 11, wherein the triggering is performed by the user based on informing the network concerning an imminent intention to travel with or drive the vehicle.

17. The method of claim 1, wherein the comparing and iteratively refining are further based on at least one of:
- a cell ID of the connected device;
- a signal strength indicator of an associated base station related to the cell ID of the connected device;
- a timing advance parameter of the associated base station related to the cell ID of the connected device;
- Global Positioning System coordinates of the base station and the connected device; and
- Media Access Control addresses visible to a local Wi-Fi hotspot.

18. The method of claim 1, wherein the removing is further based on at least one of:
- a cell ID of the connected device matches with a cell ID of the at least one candidate mobile terminal;
- a distance from the connected device to the associated base station matches, within a tolerance, a distance from the at least one candidate mobile terminal to the associated base station;
- signal strength variations of the connected device and the at least one candidate mobile terminal both exhibit a similar pattern and match with an expected pattern on the site of the vehicle; and
- the MAC address of the candidate mobile terminal having a Wi-Fi status ON is visible in an access point of the connected device.

19. A non-transitory computer readable recording medium storing a computer program product for identifying at least one mobile terminal travelling in a vehicle comprising a connected device, the computer program product comprising software instructions which, when run on processing circuitry of a computing device, causes the computing device to:
- initialize a list of identifiers (IDs) of at least one candidate mobile terminal currently travelling in the vehicle;
- obtain a current first position of the connected device and a current second position of the at least one candidate mobile terminal;
- compare the current first position and the current second position so as to determine whether the current first and second positions match; and
- iteratively refine the list of IDs depending on the match of the current first and second positions by repeating the obtaining and comparing until a predetermined condition is met, wherein:
  - the predetermined condition to be met is a predetermined number of iterations during which the list remains unchanged; and
  - the iteratively refining the list of IDs comprises removing an ID from the list of candidate mobile terminals responsive to the current first position of the connected device not matching the second position of the at least one candidate mobile terminal.

20. An apparatus for identifying at least one mobile terminal travelling in a vehicle comprising a connected device, the apparatus comprising:
- processing circuitry;
- memory containing instructions executable by the processing circuitry whereby the apparatus is operative to:
  - initialize a list of identifiers (IDs) of at least one candidate mobile terminal currently travelling in the vehicle;
  - obtain a current first position of the connected device and a current second position of the at least one candidate mobile terminal;
  - compare the current first position and the current second position so as to determine whether the current first and second positions match; and
  - iteratively refine the list of IDs, depending on the match of the current first and second positions by repeating the steps of obtaining and comparing until a predetermined condition is met, by removing an ID from the list of candidate mobile terminals responsive to the current first position of the connected device not matching the second position of the at least one candidate mobile terminal, wherein the predetermined condition to be met by iteratively refining is a predetermined number of iterations during which the list remains unchanged.

21. The apparatus of claim 20, wherein the apparatus is deployed as one of:
- a dedicated Passenger Identification Service (PIS) node; and
- an existing core network node hosting PIS service.

* * * * *